Patented Feb. 21, 1939

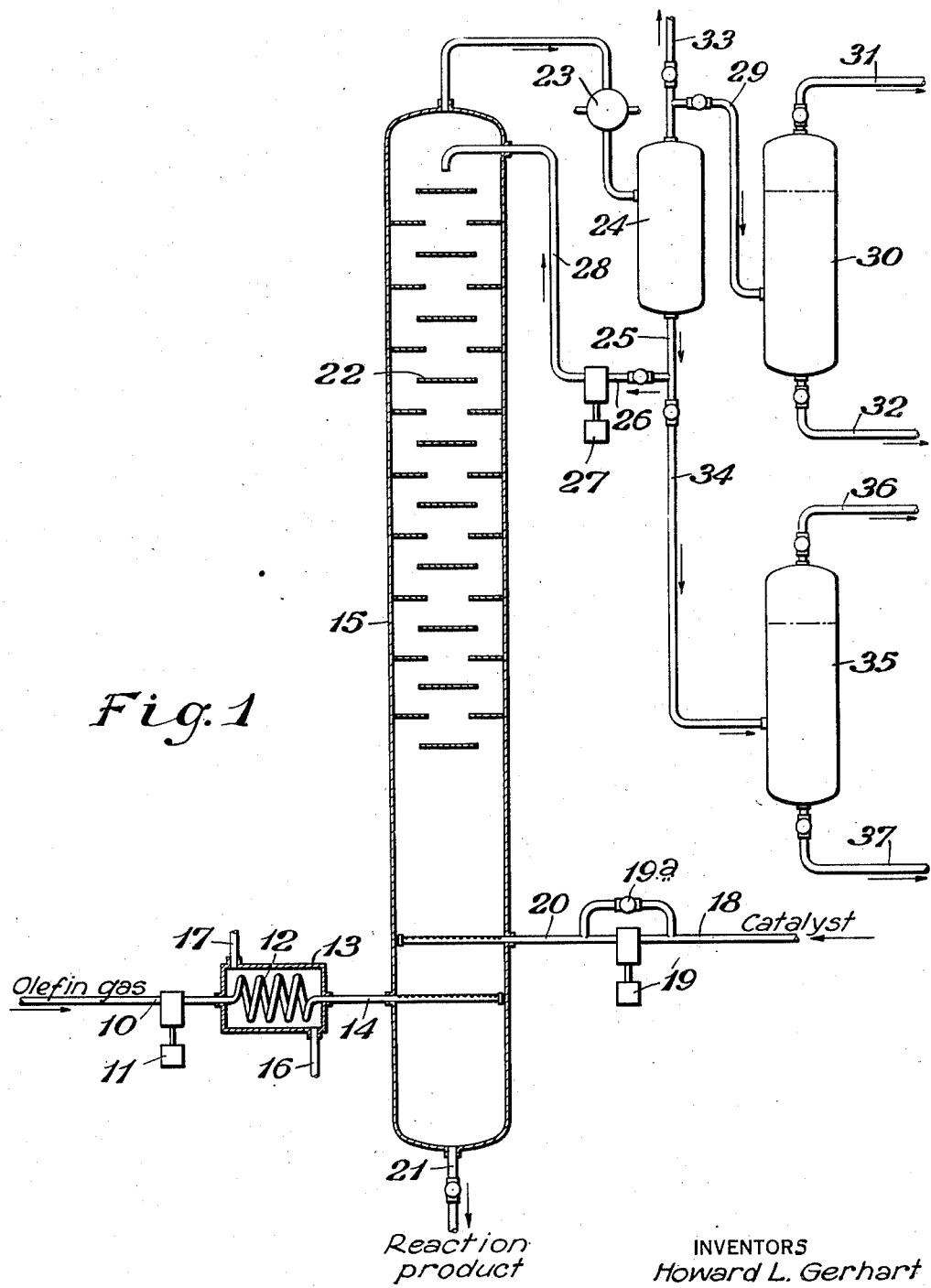

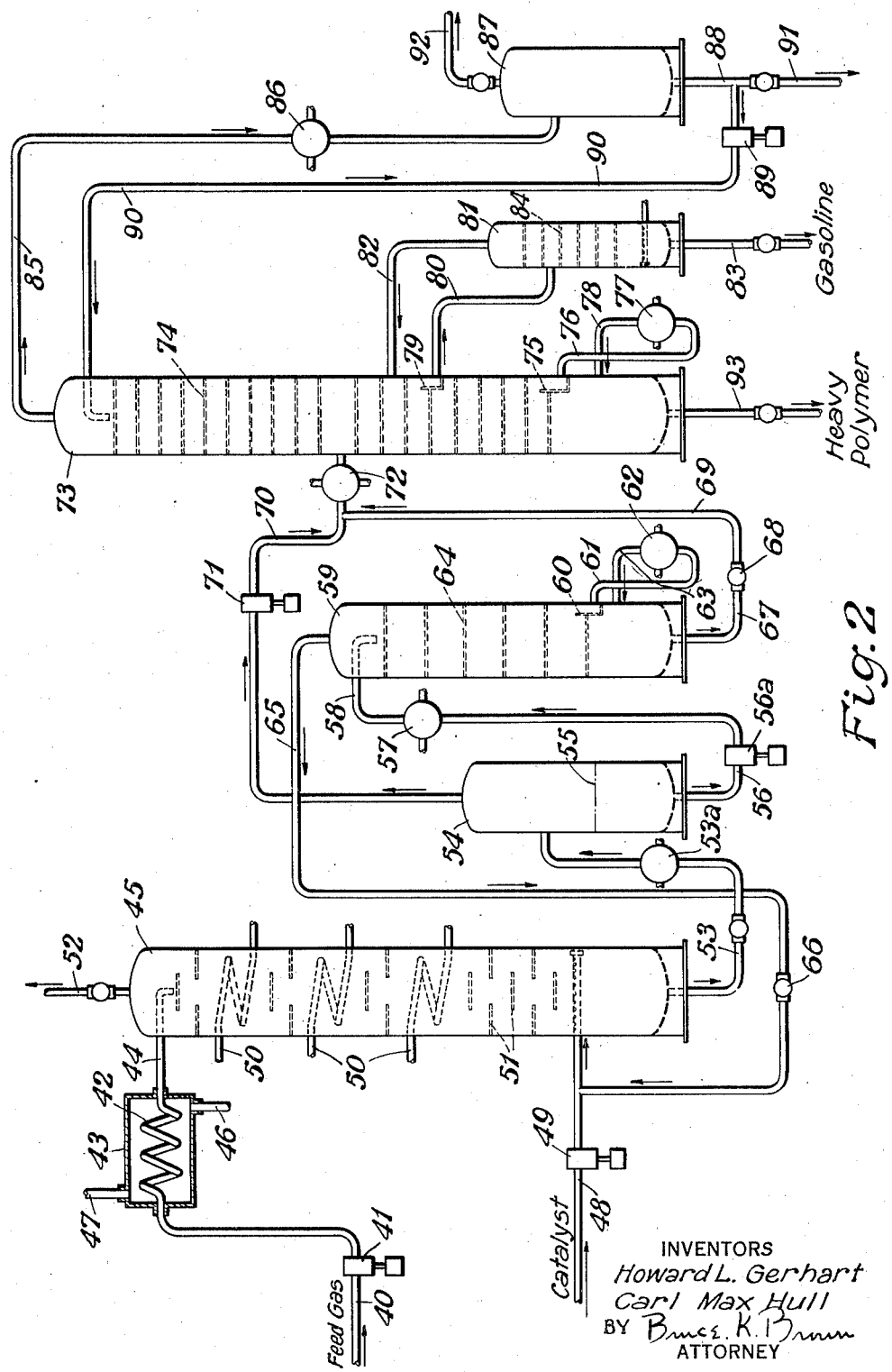

2,148,115

UNITED STATES PATENT OFFICE 2,148,115

OLEFIN POLYMERIZATION

Howard L. Gerhart, Philadelphia, Pa., and Carl Max Hull, Chicago, Ill., assignors to Standard Oil Company, Chicago, Ill., a corporation of Indiana Application June 19, 1936, Serial No. 86,076

6 Claims. (Cl. 196—10)

This invention relates to the polymerization of an admixture of olefin-containing hydrocarbons and, particularly, the normally gaseous olefinic hydrocarbons containing the butylenes such as n-butylene and iso-butylene. These gases may be derived from any suitable source such as the unsaturated gases produced by the cracking of hydrocarbon oils in the manufacture of gasoline. Products from the debutanizer and/or depropanizer reflux drum of a cracking unit are particularly desirable.

One object of this invention is to convert normally gaseous olefins into gasoline and heavier products in a continuous process with low catalyst consumption.

Another object, is to carry out such a process without the necessity of costly and time consuming catalyst regeneration. Another object is to provide an improved method and system for using a gaseous catalyst. Still another object is to utilize discoveries relating to the formation and decomposition of boron fluoride-hydrocarbon complexes to commercial advantage, particularly in the art of converting normally gaseous hydrocarbons containing olefins into gasoline or heavier liquid products.

It has been discovered that boron halides, such as boron trifluoride and boron trichloride, polymerize a substantial quantity of the unsaturated hydrocarbons present in an admixture of hydrocarbon gases to higher boiling hydrocarbons with the attendant formation of an unknown type of a reaction product between the boron halide and certain hydrocarbons. We prefer, however, to use the boron fluoride and our invention will be described with reference to it. The reaction product produced by $BF_3$ is hereafter referred to as the boron fluoride-hydrocarbon complex. The boron fluoride-hydrocarbon complex formed in this reaction will decompose at elevated temperatures and release the boron fluoride so that it can be reused to polymerize additional olefins. Admixtures of gases containing the butylenes and propylene are particularly adapted for polymerization by the process and an admixture of gases may be used comprising mostly butylenes and propylene as the unsaturated constituent, although other unsaturated (olefinic) gases may be used.

Figure 1 is a diagrammatic illustration of one arrangement of the apparatus which may be used to polymerize olefin-containing gases in accordance with the invention.

Figure 2 is a diagrammatic illustration of a modified form of the apparatus which may also be used to polymerize liquefied olefinic gases in accordance with the invention.

Referring to Figure 1, feed stock containing olefins, preferably an admixture of normally gaseous hydrocarbons containing propylene and butylenes as the predominating constituents which may be available as liquid or a gas, enter the system through line 10, is raised by pump or compressor 11 to the desired pressure, passed through the coils 12 in the heater 13 and then passed by line 14 into the lower part of the tower or reactor 15 where it is released through the perforations in pipe 14. In event the feed stock is available at a sufficiently high pressure a flow regulating valve may be used instead of the pump 11. Steam, hot oil or any suitable heating medium may be circulated around the heating coils 12 in the heater 13, introduced by conduit 16 and withdrawn by conduit 17, for the purpose of heating the feed gases in the coils to the desired temperature.

Boron fluoride is introduced into the system through conduit 18, raised to the desired pressure by the compressor 19 (or passed through flow regulating valve 19a if the boron fluoride is available under pressure) and then introduced into the lower part of the tower 15 through conduit 20 and there permitted to mix with the feed stock introduced through line 14. If desired, baffle plates or any suitable mixing means may be placed in the tower in order to facilitate the mixing of the feed stock and catalysts.

The feed gases entering the tower are heated to a temperature above 250° F. and the bottom zone of the tower 15, where the feed gases and boron fluoride enter the tower, is maintained at a temperature of at least about 250° F. to 300° F. At a temperature of the order of 250° F. and lower temperatures, the boron fluoride polymerizes a substantial amount of the unsaturated hydrocarbons into higher boiling hydrocarbons, a portion of which boils within the gasoline boiling range. At temperatures of the order of 200° F., as well as temperatures much below 200° F., the boron fluoride not only polymerizes the olefins into high boiling hydrocarbons but it also reacts to form a complex compound with the hydrocarbons present in the system. At temperatures above 250° F., and preferably above 300° F., the complex compound formed during the reaction decomposes with the liberation of the boron fluoride.

In the mixing zone, as the feed gases and boron fluoride pass up through the tower to about the middle part thereof, most of the olefins in the feed gas are polymerized into higher boiling hydrocarbons but at the temperature maintained in the lower part of the tower, 250° F. and above, the complex compound of the boron fluoride and hydrocarbons if formed, breaks down and releases the boron fluoride for further use in the polymerization reaction. The polymers condense and fall to the bottom part of the tower whereas the boron fluoride and unpolymerized hydrocarbons pass to the upper part of the tower which is maintained at a temperature preferably below about 150° F. At this lower temperature, the boron fluoride-hydrocarbon complex is formed with hydrocarbons, undoubtedly olefins, present in the tower. This complex then falls back to the lower part of the tower where the temperature is maintained at about 250° F. or above and is broken down into the polymer and boron fluoride. The boron fluoride repeats the cycle by rising to the upper part of the tower, polymerizing the olefins which escape the polymerization reaction in the lower part of the tower, forming a complex compound with the hydrocarbons present in the tower and falling back to the lower part of the tower where it is broken down and the boron fluoride is released.

The chemical structure of the boron fluoride-hydrocarbon complex formed between the boron fluoride and hydrocarbons present in the tower is not understood but whatever its chemical construction may be, it is sufficiently unstable so that it breaks up very rapidly at temperatures above 250° F. to 300° F. If temperatures much below 250° F. were employed in the lower part of tower 15, a substantial part of the boron fluoride-hydrocarbon complex would be removed with the polymers which are continuously withdrawn from the bottom of the tower through valved conduit 21.

Since the boron fluoride will polymerize the olefins into higher boiling hydrocarbons at low temperatures, the upper part of the tower may be maintained at any suitably lower temperature, but usually a temperature within the range of 150–80° F. or lower will give satisfactory results. From the foregoing discussion, it is apparent that, broadly speaking, two zones are maintained in the tower 15. The first zone being the one in which most of the polymerization reaction takes place accompanied by the breaking down of the complex compound formed between the hydrocarbons and the boron fluoride. The temperature in the bottom of the tower should be maintained above about 250° F. so that the complex which is formed between the polymer and boron fluoride will be broken down about as soon as it is formed. The second zone, the upper portion of the tower, is maintained at a temperature usually below about 150° F. so that the boron fluoride will form the complex compound and fall down the tower into the zone maintained at a temperature which will decompose or break down this complex product and release the boron fluoride. The polymer resulting from the decomposition of the complex compounds then passes on to the bottom part of the tower where it is withdrawn.

It should be understood that the tower operates with a progressive temperature change from one end to the other and the exact location where the various reactions take place cannot be accurately specified. The tower serves two purposes; first, provides the two zones required for complex formation and complex decomposition as described above and, second, serves as a fractionation tower to separate unreacted feed from the product. Baffle plates or bubble trays 22 may be placed in the tower in order to facilitate the above operation. Alternatively, a packed tower may be used in the place of one containing baffle plates or bubble trays. In fact, the packed towers may give a better contact between the gases and catalyst. Any suitable non-corrosive material may be used to pack tower 15, for example, glass beads, graphite Raschig rings, lathe turnings from non-corrosive alloys, etc.

The unreacted gases, mostly saturated hydrocarbons, pass from the top of the tower through cooler 23 and thence to the separator 24. At the pressure maintained in separator 24, a part of the cooled gases will condense and this condensate is preferably withdrawn through line 25, valved conduit 26 and passed to the pump 27 where it is forced through conduit 28 back to the top part of the tower 15 and used as reflux to maintain the low temperature in the upper part of the tower. If desired, inter-coolers may be placed in the upper part of the tower 15 to assist in maintaining the desired low temperature therein.

The pressure conditions employed in tower 15 will vary somewhat with the composition of the feed gases and the temperatures employed. In general the lower the pressure the greater the percentage of polymers boiling in the gasoline range. On the other hand, the pressure should be high enough so that hydrocarbons containing 6 or more carbon atoms will be liquids at the temperature existing at the bottom of the tower. The temperature at the top of the tower should be below about 150° F. in order that the boron fluoride-hydrocarbon complex will form, and the pressure at this temperature should be such that a portion of the unreacted hydrocarbons going overhead will be liquefied as reflux. Economic consideration will set the lower temperature limit at the top of the tower and this in turn will fix the lower pressure limit at this point.

If the feed gases are predominantly $C_4$ hydrocarbons, a gage pressure of about 90 pounds per square inch may be required in the tower 15 and separator 20 of the upper part of the tower is maintained at a temperature of about 150° F. Another example would be 45 pounds per square inch at 100° F.

If the feed gases are predominantly $C_3$ hydrocarbons, a pressure of about 300 pounds per square inch is employed in the tower 15 and separator 20 and the upper part of the tower is maintained at a temperature of about 150° F. or lower. The time of contact should be about one-tenth minute to ten minutes. Another suitable set of conditions would be 180 pounds per square inch at 100° F.

In the event a small amount of boron fluoride is taken overhead, the gases in separator 24 are passed through valved conduit 29 to the lower part of the scrubber 30 and permitted to bubble through an absorbing agent such as water or a solution of caustic soda, ammonium hydroxide or some other alkaline material to absorb the boron fluoride. The scrubbed gases leave the scrubber through valved conduit 31. A draw-off line 32 is provided in the bottom of scrubber 30 in order to remove the solution. If desired, the gases in separator 24 may be withdrawn through valved conduit 33 and disposed of in any convenient way. If all of the condensate in separator 24 is not recycled as reflux, a part or all of it may be passed through valved conduit 34 to the lower part of the scrubber or treater 35 and permitted to rise through an absorbing agent or treating liquid. The liquid products are decanted through valved conduit 36. A draw-off conduit 37 is provided in the lower part of the scrubber 35. Scrubbers 30 and 35 may be provided with suitable baffles or trays in order to effect better contact between the absorbing agent and the fluids to be scrubbed.

The polymerized hydrocarbons withdrawn from the lower part of the tower 15 may also be washed with an absorbing agent in order to remove any boron fluoride. However, if the preferred conditions are used the amount of boron fluoride contained therein is very small. The polymers removed through line 21 may be fractionated by any convenient means, for example, into a fraction boiling within the gasoline range and a higher boiling fraction. The fractionating equipment used may be the same as that shown in Figure 2. The polymers boiling within the boiling range of gasoline may be used as a high antiknock motor fuel or it may be blended with straight run or cracked gasolines.

It is apparent from the foregoing description that unsaturated hydrocarbon gases can be polymerized into hydrocarbon motor fuels without resorting to high temperatures and pressures and with the minimum amount of equipment. Since the boron fluoride-hydrocarbon complex can be broken down in situ and the boron fluoride reused, the process requires very little make-up catalyst. Small amounts of boron fluoride may be needed at intervals to compensate for mechanical losses.

The amount of boron fluoride employed to polymerize the unsaturated hydrocarbons may vary over a relatively wide range but, generally, from about .002 to .1 cubic foot of boron fluoride should be present in tower 15 for each cubic foot of space therein. Operating a tower of the type described, a product with 50 to 70% boiling in the gasoline range is produced, the CFR M octane number of this gasoline fraction being 82.5 and its A. P. I. gravity being about 59. These results are obtained from feed stocks which may be described as commercial butane cuts from cracking units, the stock containing about 40% of olefins.

Figure 2 illustrates a modified form of the process as applied to a liquid phase operation for polymerizing gases containing olefinic hydrocarbons. The olefin-containing feed gases, preferably a fraction of gases containing propylene and the butylenes as the predominating constituents, are charged to the system through conduit 40, by pump or compressor 41 and passed through the coils 42 in heater 43 and then passed by line 44 to the upper part of the reactor 45. Steam, hot oil or any suitable heating medium may be circulated to and from the heater 43 by lines 46 and 47. Under the temperature and pressure conditions maintained in reactor 45, the polymerization reaction is carried out in the liquid phase and a substantial proportion of the polymers formed from the olefins propylene, butylene, isobutylene, etc., boils within the gasoline boiling range. In addition, some of the polymers will boil above the gasoline boiling range.

Boron fluoride gas enters the system through conduit 48, is raised by compressor 49 to the desired pressure and then introduced into the bottom part of the reactor through a perforated pipe or other conventional means and permitted to pass up through the reactor countercurrent to the liquefied feed stock entering the top of the tower. The materials in reactor 45 are maintained at a temperature below 250° F. so that the boron fluoride will polymerize the unsaturated hydrocarbons into heavier hydrocarbons, some of which will boil below 400° F. At temperatures below about 200° F. the boron fluoride also forms a complex compound with the liquefied materials undergoing polymerization and once this complex compound has formed, the boron fluoride in combination therewith appears to have no further part in the polymerization reaction until it is released. It should be understood that this boron fluoride-hydrocarbon complex will form to a lesser degree at temperatures slightly above 200° F., for example, at temperatures around 240° F. but it is preferred to operate reactor 45 at temperatures below 200° F. in order to insure the rapid and complete formation of the complex compound.

Intercoolers 50 may be placed in the reactor 45 in order to maintain the temperature therein at the desired level and to dissipate the heat resulting from the polymerization reaction. Baffle plates, packing material, or bubble trays 51 may also be placed in the reactor in order to bring about intimate contact between the boron fluoride gas and the liquid hydrocarbons undergoing polymerization. If the temperature in the reactor 45 is permitted to rise much above 240° F., the boron fluoride complex will not form, or at least will decompose about as soon as it is formed. Consequently, it is desirable to maintain the temperature in reactor 45 at a low temperature so as to insure the rapid formation of the complex compound. Also, the lower the temperature in reactor 45 the lower the pressure needed in order to liquefy the feed gases. We may operate reactor 45 within a very wide range of temperatures and pressures and generally the temperature therein is maintained within the range of 240 to +50° F. but it is preferred to maintain a temperature within the range of 200° F. to 50° F. At very low temperatures, and particularly at temperatures below about 20° F., a substantial part of the polymers produced by the reaction, boil above the gasoline boiling range, that is, above 410° F. The pressure maintained in reactor 45 should be high enough to maintain the feed stock in a liquid condition and, of course, this pressure will vary according to the composition of the feed stock and the temperature used. If the feed stock consists mostly of hydrocarbons containing four carbon atoms each and the reactor is operated at a temperature of about 50° F., the pressure therein should be maintained at about 10 pounds per square inch or higher whereas if the temperature in the reactor is maintained at about 180° F., the pressure therein should be maintained at about 150 pounds per square inch or higher. If the feed stock contains a large quantity of hydrocarbons containing three carbon atoms each and the reactor is operated at a temperature of about 50° F., the pressure therein should be maintained at about 90 pounds per square inch or higher, whereas, if the temperature in reactor 45 is about 180° F., the pressure therein should be maintained at about 500 pounds per square inch or higher. It is apparent that the particular pressure to be used in reactor 45 will vary according to the vapor pressure of the feed stock.

A valved vent 52 may be placed in the top of reactor 45 so as to release any unliquefied gases such as hydrogen, methane, ethane and nitrogen which may accumulate in the top part of the reactor.

The polymers or high boiling hydrocarbons as well as the boron fluoride-hydrocarbon complex and unreacted feed stock are withdrawn from the bottom of the reactor through valved conduit 53 and cooler 53a, which may or may not be used and passed to the separator 54 wherein the complex compound is permitted to separate from the liquid polymers and settle to the bottom part of the separator 54. The hydrocarbons with which the boron fluoride has not formed a complex, remain in the top part of the separator, giving a liquid interface 55. Preferably the level of interface 55 is maintained below the point where conduit 53 enters separator 54.

The boron fluoride-hydrocarbon complex layer is withdrawn from the bottom of separator 54 through conduit 56, is passed by pump 56a through heater 57 and then introduced by line 58 into the top part of the tower 59 where the boron fluoride-hydrocarbon complex is separated into boron fluoride and hydrocarbons. A portion of the hydrocarbons in the bottom part of tower 59 is withdrawn from the trap-out plate 60 through line 61, heated in the reboiler 62 and returned to the bottom part of the tower through line 63. By aid of the reboiler 62 and the heater 57, the boron fluoride-hydrocarbon complex in tower 59 is heated to a temperature above 250° F. and preferably above 300° F. so as to decompose the complex compound into boron fluoride and free polymer. Baffle plates, bubble plates are perforated trays 64 may be provided in the tower 59. The boron fluoride driven off from the complex is removed from the top of tower 59 through conduit 65 and valve 66 and then returned to line 48 for reuse in the reactor 45.

The hydrocarbons are withdrawn from the bottom of tower 59 through line 67, and through valve 68, and passed by line 69 to line 70. Line 70 and pump 71 are used to withdraw the free polymers and unreacted hydrocarbons from the top part of separator 54. These hydrocarbons and polymers are then passed to heater 72 and thence into the fractionating tower 73.

In the event a small amount of boron fluoride is present in the streams in lines 69 and 70, they may be washed with an absorbing agent before being introduced into the fractionating tower.

The fractionating tower 73 is a conventional type of tower and is used to separate the polymerized products into heavy polymers, polymers boiling within the gasoline boiling range and unconverted gases. Bubble trays or fractionating means 74 are provided in the tower in order to facilitate the fractionation of the polymers therein. A portion of the products in the bottom part of the tower 73 is withdrawn from trap-out tray 75 through line 76, heated in the reboiler 77 and again introduced into the bottom part of the fractionating tower through line 78. Products near the middle portion of the tower are withdrawn from trap-out plate 79 through line 80 and passed to the side stripper 81. The volatile constituents removed from the products in the side stripper using steam for example, are returned to the fractionating tower through line 82 and the gasoline or polymers boiling within the gasoline range are withdrawn from the bottom part of the side stripper through valved conduit 83. Bubble trays 84 are used in the stripper in order to facilitate the fractionation of the products introduced therein. The unconverted gases are removed from the top of the tower through line 85 to the cooler 86 and thence to the separator 87. Condensate from separator 87 is passed by line 88 with the aid of pump 89 through conduit 90 to the top of the fractionating tower 73 and introduced therein as reflux. The unused portion of the condensate may be disposed of through valved conduit 91. The uncondensed gases in separator 87 are withdrawn through valved conduit 92. The heavy polymers in the bottom part of tower 73 are withdrawn through valved conduit 93.

By varying the temperature in reactor 45, the amount of heavy polymers produced by my process may be varied somewhat. The lower the temperature employed in reactor 45, the greater will be the amount of heavy polymers produced by the polymerization reaction. It is preferred, however, to operate reactor 45 at a temperature which will produce the minimum amount of heavy polymers and give a high yield of polymers boiling within the gasoline range. By operating the reactor 45 at temperatures above 100° F., it is found that a substantial portion of the polymers produced by the process will boil within the boiling range of hydrocarbons present in gasoline. That is, a substantial part of the polymers will boil below about 420–430° F.

While the process has been described with reference to certain temperature and pressure conditions, it should be understood that these conditions may be varied somewhat without departing from the scope of the invention as defined by the claims.

We claim:

1. In the process of polymerizing an admixture of normally gaseous hydrocarbons containing butylenes into normally liquid hydrocarbons which boil within the gasoline boiling range, the steps comprising introducing said gases and gaseous boron fluoride into the bottom part of an elongated reaction zone maintained at a temperature above 200° F. wherein said gases are polymerized by the boron fluoride to form liquid hydrocarbons boiling within the gasoline boiling range, permitting the unreacted gases and boron fluoride to pass into the upper part of the reaction zone which is maintained at a temperature below about 150° F. whereby the boron fluoride and unsaturated gases react to form a complex compound that condenses and falls back to the lower part of the reaction zone, withdrawing unreacted hydrocarbon gases from the top part of said zone, and withdrawing the polymerized liquid hydrocarbons from the bottom part of said zone.

2. In the manufacture of normally liquid products from normally gaseous olefins, the method of simultaneously polymerizing the olefins, fractionating the polymerization products, and regenerating the polymerization catalyst in a single tower which comprises introducing compressed normally gaseous olefins at the base of said tower together with a small amount of boron fluoride, maintaining the lower part of said tower at a temperature of at least 250° F., passing said compressed olefins together with admixed boron fluoride upwardly into cooler portions of said tower maintained at temperatures below 200° F. wherein both polymerization products and boron fluoride hydrocarbon complexes are formed and permitted to fall back into a lower part of the tower, removing unreacted gases from the top of said tower and removing polymerization products from the bottom of said tower.

3. In the process of polymerizing an admixture of normally gaseous olefinic hydrocarbons into liquid hydrocarbons, the steps comprising introducing the admixture of gases and gaseous boron fluoride into the lower part of an upright elongated reaction zone wherein said hydrocarbon gases are polymerized by the boron fluoride to form liquid hydrocarbons boiling within the gasoline range, maintaining the temperature in the lower part of said reaction zone above 250° F. and maintaining a temperature in the top part of said reaction zone below about 150° F., permitting the unreacted gases and boron fluoride to pass into the upper part of said reaction zone wherein the boron fluoride and unsaturated gases react to form a complex compound that condenses and falls back to a lower part of the reaction zone and there decomposes into boron fluoride gas and liquid hydrocarbons, withdrawing unreacted gases from the top part of said zone, and withdrawing normally liquid hydrocarbons from the bottom part of said zone.

4. In the process of converting an admixture of normally gaseous hydrocarbons consisting mostly of butylenes into liquid hydrocarbon products in an upright elongated reaction zone wherein a decreasing temperature gradient is maintained from the lower part to the upper part of said zone, the steps comprising introducing an admixture of compressed normally gaseous olefins consisting mostly of butylenes into the lower part of said reaction zone with a small amount of boron fluoride gas, maintaining the lower part of said tower at a temperature above about 250° F., passing said compressed gases with admixed boron fluoride upwardly into cooler portions of said tower wherein both hydrocarbon products and boron fluoride-hydrocarbon complexes are formed and are permitted to fall back into hotter parts of said reaction zone, removing unreacted gases from the top of said zone, removing liquid hydrocarbons from the bottom part of said zone and fractionating said liquid hydrocarbons to recover hydrocarbons boiling within the gasoline range.

5. The process of converting olefinic gaseous hydrocarbons into liquid hydrocarbons in an elongated reaction zone wherein a decreasing temperature gradient is maintained throughout said zone, the steps comprising introducing boron fluoride and an admixture of normally gaseous hydrocarbons containing iso-butylene into one end of said zone which is maintained at a temperature above 250° F., passing said gases with admixed boron fluoride into cooler portions of said zone wherein both liquid hydrocarbons and boron fluoride-hydrocarbon complexes are formed, returning the boron fluoride-hydrocarbon complexes to a portion of said zone which is maintained at a temperature above 250° F. to decompose the boron fluoride-hydrocarbon complex into boron fluoride and liquid hydrocarbons, removing unreacted hydrocarbon gases from the system, removing liquid hydrocarbons from a portion of said zone maintained at a temperature above 250° F., and fractionating said liquid hydrocarbons to recover hydrocarbons within the gasoline boiling range and liquid hydrocarbons which boil above the gasoline boiling range.

6. The process of polymerizing normally gaseous olefins to liquid motor fuels boiling mainly within the gasoline boiling range which comprises forming a complex hydrocarbon compound of a boron halide, heating said normally gaseous olefins to a temperature above the decomposition temperature of said complex compound, contacting said olefins while heated to said temperature with said complex compound, whereby said complex hydrocarbon compound is decomposed to liberate boron halide and said olefins are substantially polymerized to motor fuels by said liberated boron halide, withdrawing and cooling liberated boron halide and unreacted gases to a temperature below the decomposition temperature of said complex compound, whereupon said complex is formed, separating said complex compound from unreacted gases and recycling it to said contacting step, withdrawing polymerized reaction products from the contacting zone and fractionally distilling them to produce the desired motor fuel.

HOWARD L. GERHART.
CARL MAX HULL.